(12) United States Patent
Imagawa et al.

(10) Patent No.: US 7,511,900 B2
(45) Date of Patent: Mar. 31, 2009

(54) LENS BARREL

(75) Inventors: Hiroaki Imagawa, Tokyo (JP); Keita Takahashi, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 40 days.

(21) Appl. No.: 11/893,317

(22) Filed: Aug. 15, 2007

(65) Prior Publication Data

US 2008/0043348 A1 Feb. 21, 2008

(30) Foreign Application Priority Data

Aug. 18, 2006 (JP) ............................ 2006-223580
Aug. 18, 2006 (JP) ............................ 2006-223581

(51) Int. Cl.
*G02B 7/02* (2006.01)
(52) U.S. Cl. .................. 359/813; 359/811; 359/819
(58) Field of Classification Search ......... 359/694–701, 359/811–813, 819–823
See application file for complete search history.

(56) References Cited

U.S. PATENT DOCUMENTS

| 7,218,460 B2 * | 5/2007 | Nuno .......................... 359/704 |
| 7,280,291 B2 * | 10/2007 | Tsuji .......................... 359/819 |

FOREIGN PATENT DOCUMENTS

| JP | 2003-315861 | 11/2003 |
| JP | 2004-347615 | 12/2004 |
| JP | 2005-004232 | 1/2005 |

* cited by examiner

*Primary Examiner*—Mohammed Hasan
(74) *Attorney, Agent, or Firm*—Straub and Pokotylo; John C. Pokotylo

(57) ABSTRACT

A lens barrel of the present invention is of a retractable type. After one frame is retreated from a photographing optical path, another frame moves in an optical axis direction to a position where the one frame has been disposed. The one frame is, for example, a lens frame, and the other frame is, for example, a shutter frame. The present invention can be understood as the invention of a method of switching the lens barrel to a stored state (a retracted state).

17 Claims, 11 Drawing Sheets

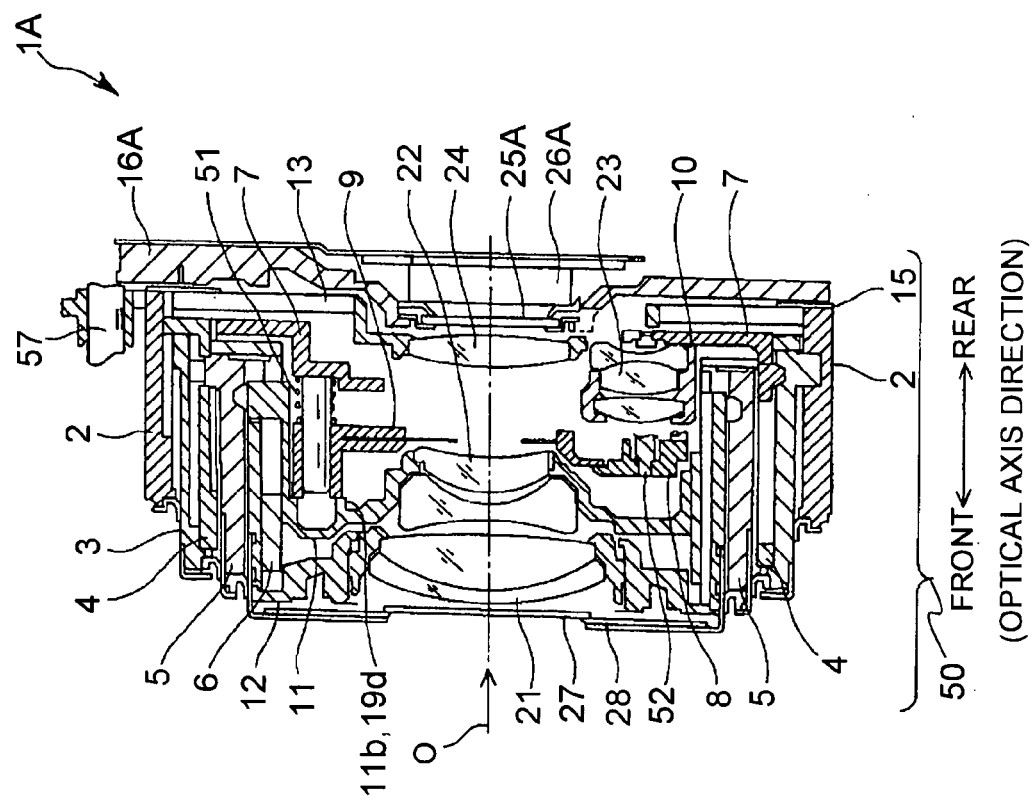

LENS BARREL

CROSS-REFERENCE TO RELATED APPLICATION

This application is based upon and claims the benefit of priority from prior Japanese Patent Application Nos. 2006-223580 filed on Aug. 18, 2006, and 2006-223581 filed on Aug. 18, 2006, the entire contents of which are incorporated herein by reference.

BACKGROUND OF THE INVENTION

1. Field of the Invention

The present invention relates to a lens barrel that can be switched to a projected state in which the lens barrel is projected in an optical axis direction and a stored state in which the lens barrel is stored.

2. Description of the Related Art

Heretofore, a so-called retractable lens barrel is known that can be switched to a projected state (a photographable state) in which the lens barrel is projected in an optical axis direction and a stored state (a retracted state) in which the lens barrel is stored. In the retractable lens barrel, it is variously proposed that a predetermined lens be retreated in the retracted state or that the lens be inserted into a lens shutter to reduce a length of the retracted lens barrel.

In a retractable lens barrel disclosed in, for example, Japanese Patent Application Laid-Open No. 2004-347615, the lens shutter can be moved in the optical axis direction with respect to a lens unit. Moreover, in the retracted state, an opening of the lens shutter is opened, and the lens unit is inserted into the opening to reduce a dimension of the retracted lens barrel in the optical axis direction.

In a retractable lens barrel disclosed in Japanese Patent Application Laid-Open No. 2003-315861, in the retracted state, a part of optical elements is retreated at a position away from an optical axis of another optical element, and the other optical element is positioned at a retreated space to reduce the dimension of the retracted lens barrel in the optical axis direction.

A lens barrel disclosed in Japanese Patent Application Laid-Open No. 2005-004232 includes a position control cam which extends in parallel with an optical axis, and a retreated lens unit support frame which can be moved with respect to this position control cam in the optical axis direction. Moreover, when the position control cam comes close to the retreated lens unit support frame, the position control cam engages with a cam follower of the retreated lens unit support frame, and the retreated lens unit support frame is rotated to a retracted position. When the retreated lens unit support frame is retreated in this manner, thickness of the retracted lens barrel in the optical axis direction can be reduced. It is to be noted that the position control cam is disposed at an image pickup device holding frame which holds an image pickup device such as a CCD. Owing to such restrictions, a lens space between the retreated lens and a lens disposed before or after the retreated lens cannot be reduced.

BRIEF SUMMARY OF THE INVENTION

A lens barrel of the present invention is of a retractable type. After one frame retreats from a photographing optical path, another frame moves in an optical axis direction to a position from which the one frame has retreated. The one frame is, for example, a lens frame, and the other frame is, for example, a shutter frame.

One example of a constitution of the present invention can be represented as follows. A lens barrel to be switched between a photographing state and a stored state in which the lens barrel is reduced in an optical axis direction as compared with the photographing state, comprising: a retreating frame which is disposed at an advanced position where the retreating frame advances into an optical path at a time when the lens barrel is in the photographing state and which is disposed at a retreated position where the retreating frame retreats from the optical path at a time when the lens barrel is in the reduced state; a support frame which supports the retreating frame at the advanced position and the retreated position; a first translational frame which is supported by the support frame and which is relatively displaced in the optical axis direction; an urging spring which biases the support frame to come away from the first translational frame in the optical axis direction; a second translational frame which moves during the switching of the lens barrel; a retreating frame driving cam which engages with the retreating frame while the lens barrel is switched from a projected state to the stored state so as to position the retreating frame at the retreated position; and a frame driving mechanism which drives at least the support frame and the second translational frame in the optical axis direction and which displaces the first translational frame in the optical axis direction toward the support frame against an urging force of the urging spring, after the retreating frame is displaced from the advanced position to the retreated position, in a case where the lens barrel is switched from the projected state to the stored state.

The present invention can be understood as the invention of a method of switching a lens barrel to a stored state (a retracted state).

BRIEF DESCRIPTION OF THE DRAWINGS

FIG. 8 is a sectional view of the lens barrel of FIG. 1 along the optical axis, showing a state in which the lens barrel is retracted from the wide-angle end and in which a shutter frame starts to be collapsed, after a third unit lens is retreated;

FIG. 9 is a sectional view showing a retracted state of the lens barrel of FIG. 1 along the optical axis;

DETAILED DESCRIPTION OF THE PREFERRED EMBODIMENT

Figure 1:
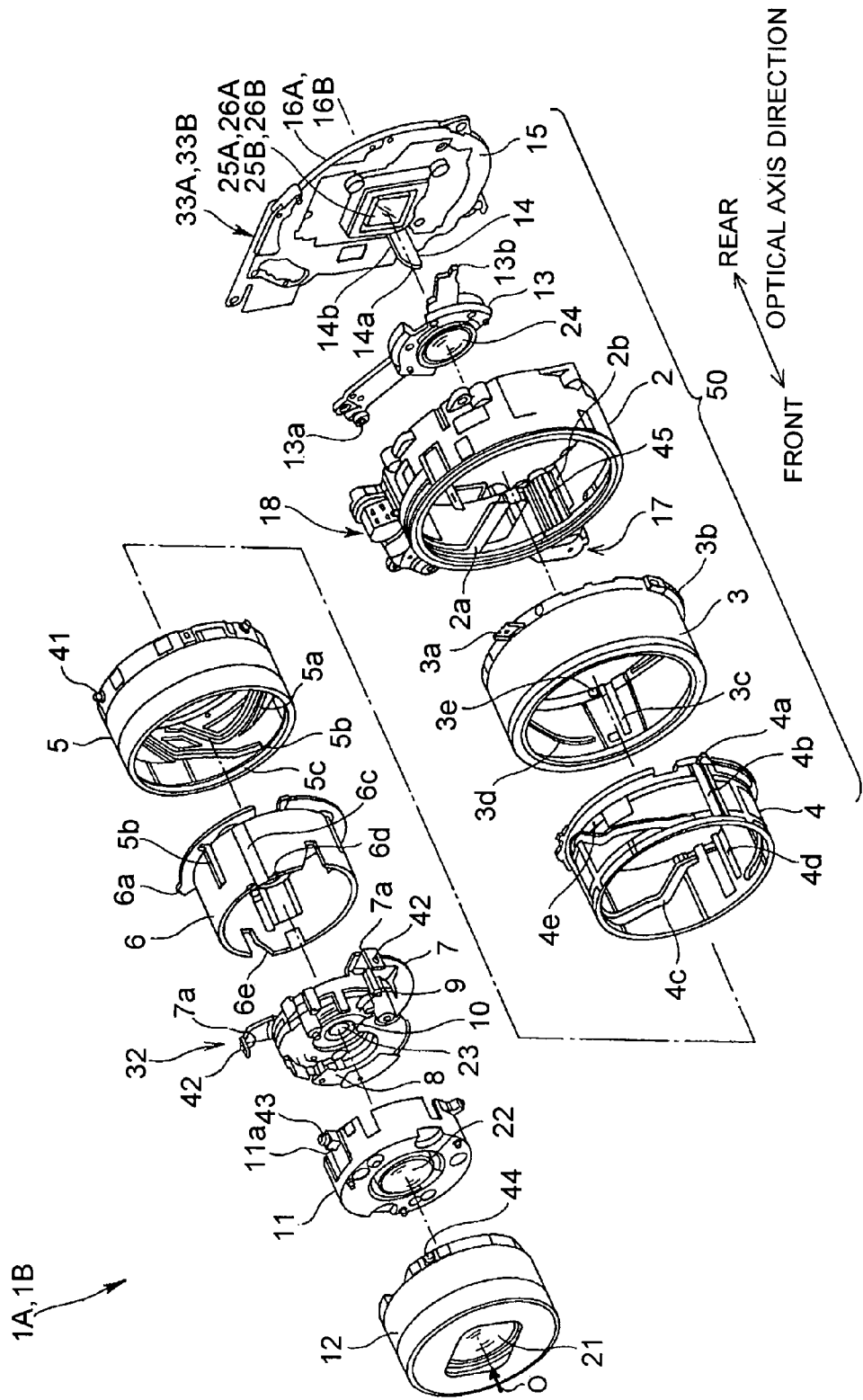
FIG. 1 is an exploded perspective view of a lens barrel provided with an image pickup unit according to one embodiment of the present invention.
Figure 2:
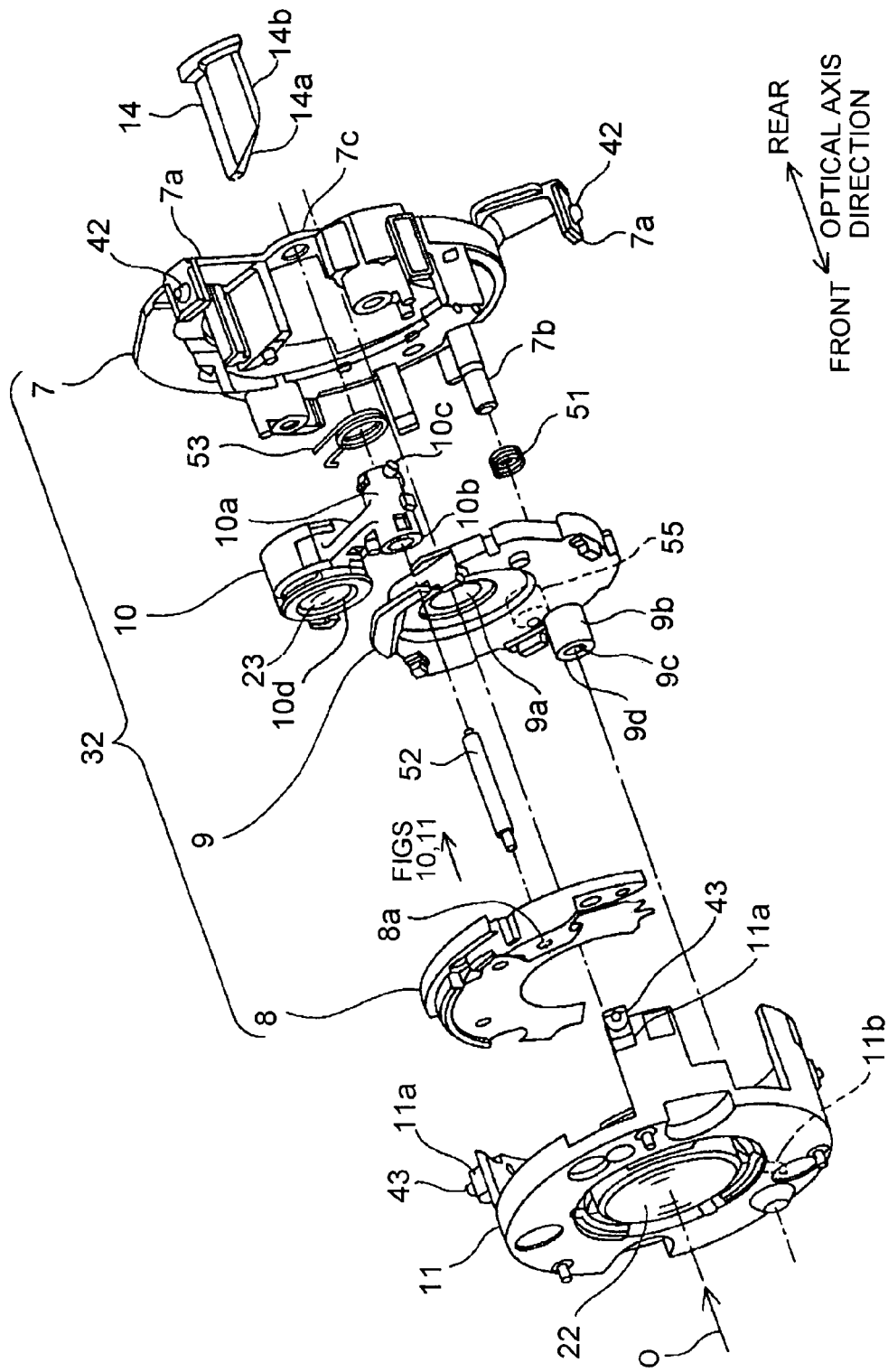
FIG. 2 is an exploded perspective view of a second unit frame, a third unit provided with a shutter, and a retreating cam among lens frame members constituting the lens barrel of FIG. 1.
Figure 3:
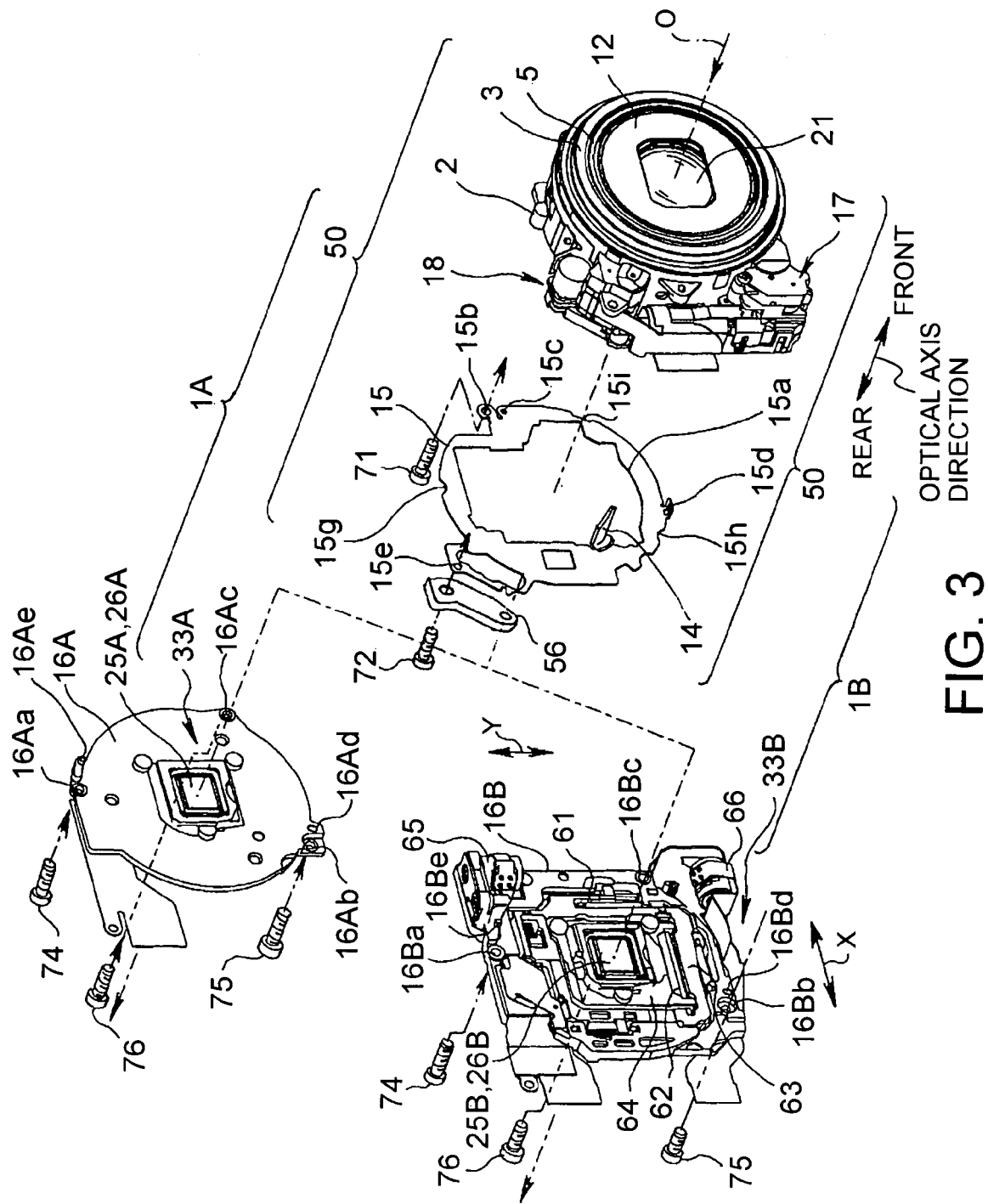
FIG. 3 is an exploded perspective view showing a lens barrel main body section constituting the lens barrel of FIG. 1 and a sensor unit attachable to the main body section and having two different functions.
Figure 4:
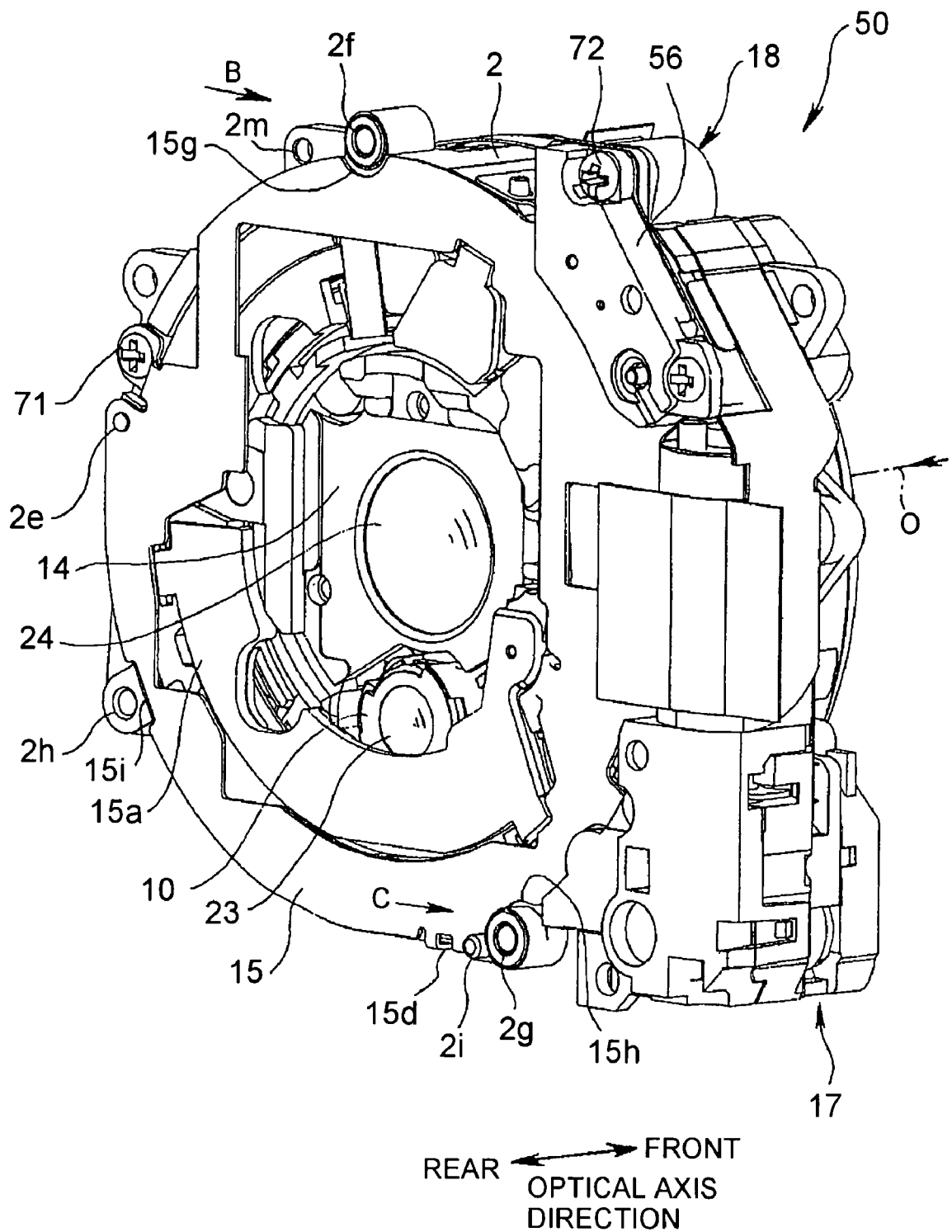
FIG. 4 is a perspective view of the lens barrel of FIG. 1 in which the lens barrel main body section provided with a holding plate is viewed from behind (a CCD attached side)
Figure 5:
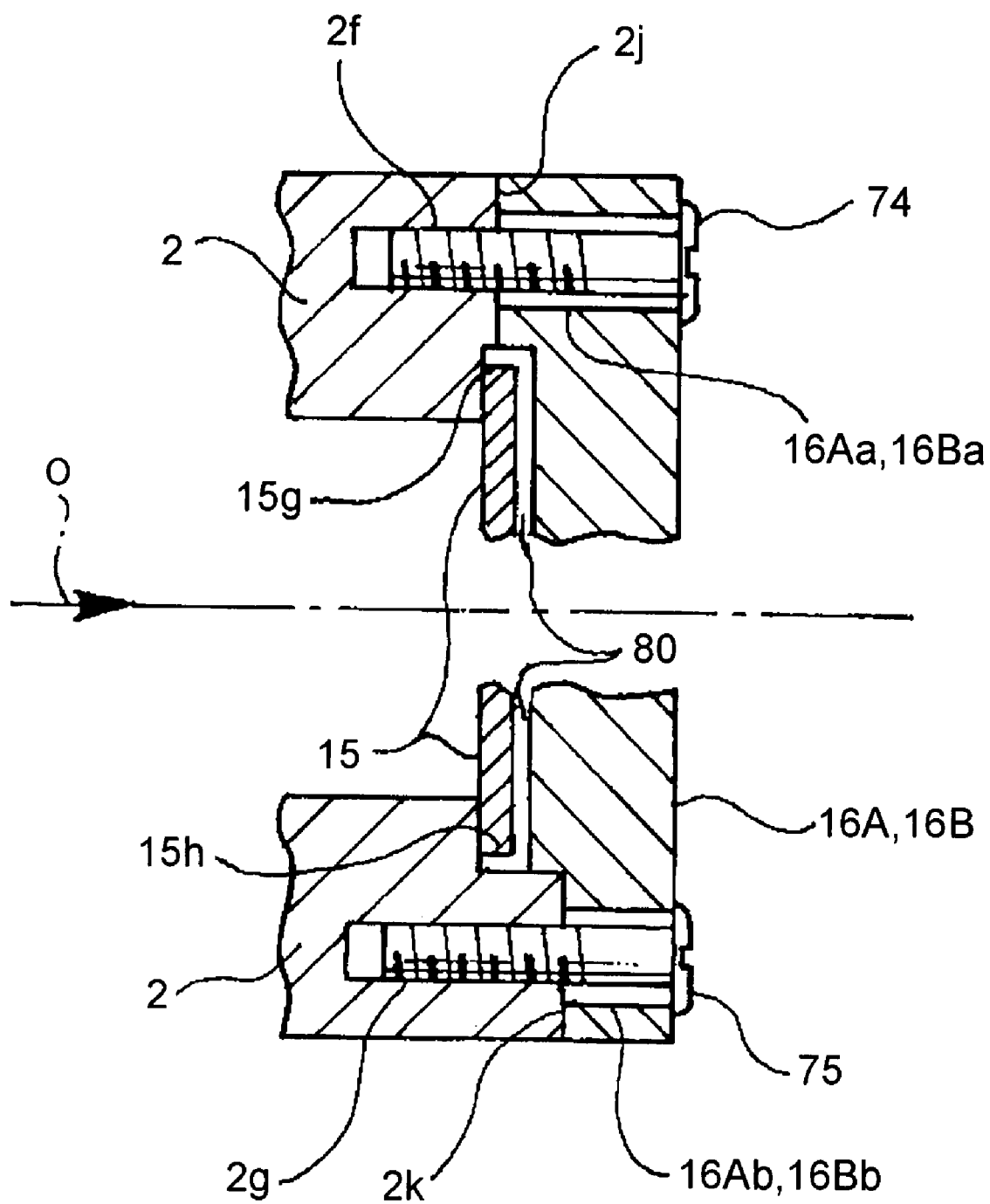
FIG. 5 is a partial sectional view cut along the arrows B and C of FIG. 4, showing a section to which the lens barrel main body section, the holding plate and a sensor base are attached.

FIG. 1 is an exploded perspective view of a lens barrel provided with an image pickup unit according to one embodiment of the present invention. FIG. 2 is an exploded perspective view of a second unit frame, a third unit provided with a shutter, and a retreating cam among lens frame members constituting the lens barrel of FIG. 1. It is to be noted that FIG. 2 shows a state viewed from the lower left part of FIG. 1 in order to show details. FIG. 3 is an exploded perspective view showing a lens barrel main body section constituting the lens barrel and an image pickup unit attachable to the main body section and having two different functions. FIG. 4 is a perspective view of the lens barrel in which the lens barrel main body section provided with a holding plate is viewed from behind (a CCD attached side). FIG. 5 is a partial sectional view cut along the arrows B and C of FIG. 4, showing a section to which the lens barrel main body section, the holding plate and a sensor base are attached.

It is to be noted that, in the following description, it is assumed that an optical axis of a photographing lens is O, a subject side in a direction of the optical axis O is a front side (an extending direction of each lens frame), and an image forming side is a rear side (a retracting direction of each lens frame). A rotating direction of each member is a rotating direction viewed from the front side.

Each of lens barrels 1A and 1B of the present embodiment is a retractable lens barrel that can be switched to a photographable state in which the lens barrel is projected in an optical axis O direction and a retracted state in which the lens barrel is stored. The present lens barrels 1A, 1B are image pickup units having different functions (specifications) with respect to a lens barrel main body section 50 as shown in FIG. 3. A sensor unit 33A of a first image pickup unit having a first function (an image pickup function without camera-shake correction) or a sensor unit 33B of a second image pickup unit having a second function (an image pickup function provided with camera-shake correction) is selectively attached to the lens barrel main body section.

As shown in FIG. 1, the lens barrel main body section 50 has a fixed frame 2, a rotary frame 3, a movable frame 4, a cam frame 5, a rectilinear guide frame 6, a shutter/third unit 32, a second unit frame 11, a first unit frame 12, a fourth unit frame 13 and a holding plate 15. The lens barrel main body section 50 has, as photographing lens units, a first unit lens 21 held by the first unit frame 12, a second unit lens 22 held by the second unit frame 11, a third unit lens 23 which is a lens part (a retreated lens) held by a third unit frame 10 as a retreating frame, and a fourth unit lens 24 which is a focusing lens held by the fourth unit frame 13.

The fixed frame 2 is a cylindrical member, and an inner peripheral portion of the fixed frame is provided with a cam groove 2a, and a rectilinear groove 2b along the optical axis O. The cam groove is constituted by continuously connecting a tilted cam groove portion which is tilted with respect to the optical axis O to a circumferential cam groove portion which is disposed along a circumference. An outer peripheral portion of the fixed frame is provided with a zooming unit 17 which is a unit to drive zooming of the photographing lens and which includes a zoom motor, a gear array and a long gear 45. The outer peripheral portion is also provided with a focusing unit 18 which is a unit to drive focusing of the photographing lens and which includes a focus motor, a gear array, a feed screw and a guide shaft 57. It is to be noted that the long gear 45 is supported so as to be exposed at the inner peripheral portion of the fixed frame 2 in parallel with the optical axis O.

The rotary frame 3 is supported by the fixed frame 2, and driven so as to rotate and move forwards and backwards during the zooming and at a time when the lens barrel is driven so as to be retracted. The rotary frame 3 is a cylindrical member which fits into the inner peripheral portion of the fixed frame 2 so as to be rotatable and movable forwards and backwards. A rear portion of an outer periphery of the rotary frame 3 is provided with a cam follower 3a to be slidably fitted into the cam groove 2a of the fixed frame 2, and a gear portion 3b to be engaged with the long gear 45. An inner peripheral portion of the rotary frame is provided with a cam groove 3d for the third unit which is tilted with respect to the optical axis O, and a rectilinear groove 3c for the cam frame which is disposed along the optical axis O. A protrusion 3e is disposed at a rear end portion of an inner periphery of the rotary frame.

Since the cam follower 3a slidably fits into the cam groove 2a of the fixed frame 2, this rotary frame 3 is rotated by the long gear 45 via the gear portion 3b. While the rotary frame 3 is rotated, the lens barrel is extended from a retracted position to a wide-angle end where the photographing can be performed. The rotary frame is rotated without moving forwards or backwards in the optical axis O direction from the wide-angle end to the telephoto end.

The movable frame 4 moves forwards and backwards together with the rotary frame 3 in a state in which the rotation is regulated. The movable frame 4 is a cylindrical member relatively movably fitted into the inner peripheral portion of the rotary frame 3, and can move forwards and backwards in a state in which the rotation is regulated by the fixed frame 2. A rear end outer peripheral portion of this movable frame 4 is provided with a guide protruding portion 4a to be fitted into the rectilinear groove 2b of the fixed frame 2. Furthermore, as groove portions extended through inner and outer peripheries of the movable frame, a cam groove 4c for the cam frame which is tilted with respect to the optical axis O, and a rectilinear groove 4b for the third unit are disposed. A rear portion of an outer periphery of the movable frame is provided with a circumferential groove 4e.

In a case where this movable frame 4 is fitted into the inner peripheral portion of the rotary frame 3 so as to fit the protrusion 3e into the circumferential groove 4e, the movable frame is connected (bayonet connection) to the rotary frame 3 so that the movable frame 4 can rotate with respect to the rotary frame 3 and move along the optical axis O integrally with the rotary frame 3.

The cam frame 5 rotates together with the rotary frame 3, and moves forwards and backwards. The cam frame 5 is a cylindrical member to be fitted into the inner peripheral portion of the movable frame 4. A rear portion of an outer periphery of the cam frame 5 is provided with a cam follower 41. An inner peripheral portion of the cam frame is provided with a cam groove 5a for the second unit which is tilted with respect to the optical axis O and a cam groove 5b for the first unit. A front end portion of the cam frame is provided with a circumferential groove 5c.

This cam frame 5 is disposed in a state in which the cam follower 41 slidably engages with the cam groove 4c of the movable frame 4. A tip end portion of the cam frame is fitted into and supported by the rectilinear groove 3c of the rotary frame 3. The cam frame is supported in a state in which the cam frame rotates together with the rotary frame 3 and relatively moves forwards and backwards.

The rectilinear guide frame 6 moves forwards and backwards together with the cam frame 5 in a regulated rotation state. The rectilinear guide frame 6 is a cylindrical member, and the rotation of the frame is regulated by the movable frame 4. Moreover, the rectilinear guide frame 6 is supported so as to be movable forwards and backwards, and supported so as to be relatively rotatable in a state in which the frame is fitted into the inner peripheral portion of the first unit frame 12 in the cam frame 5. A rear end outer peripheral portion of this rectilinear guide frame 6 is provided with a guide protruding portion 6a to be fitted into a rectilinear groove 4d of the movable frame 4. Furthermore, the rectilinear guide frame is provided with a rectilinear groove 6b for the second unit which extends through inner and outer peripheries of the frame and which is disposed along the optical axis O. An outer peripheral portion of the frame is provided with a rectilinear groove 6c for the first unit disposed along the optical axis O and having a bottom. A front end outer peripheral portion of the frame is provided with a protruding portion 6d.

This rectilinear guide frame 6 is connected (bayonet connection) to the cam frame 5 so as to be relatively rotatable and movable integrally with the cam frame 5 in the optical axis O, when the rectilinear guide frame 6 is fitted into the inner peripheral portion of the first unit frame 12 fitted into the inner peripheral portion of the cam frame 5 and the protruding portion 6d is fitted into the circumferential groove 5c of the cam frame 5.

The second unit frame 11 is driven to move forwards and backwards by the cam frame 5 in the regulated rotation state. The second unit frame 11 is a cylindrical member, and is fitted into and supported by the inner peripheral portion of the rectilinear guide frame 6. The second unit lens 22 is held at a front surface opening of the second unit frame 11, and an outer peripheral portion of the second unit frame is provided with a guide protrusion 11a and a cam follower 43 projected from the protrusion.

The guide protrusion 11a fits into the rectilinear groove 6b of the rectilinear guide frame 6, and the cam follower 43 is inserted into the rectilinear groove 6b to slidably fit into the cam groove 5a of the cam frame 5. Therefore, the second unit frame 11 is driven so as to move forwards and backwards by the cam frame 5 in a state in which the rotation is regulated by the rectilinear guide frame 6.

Figure 6:
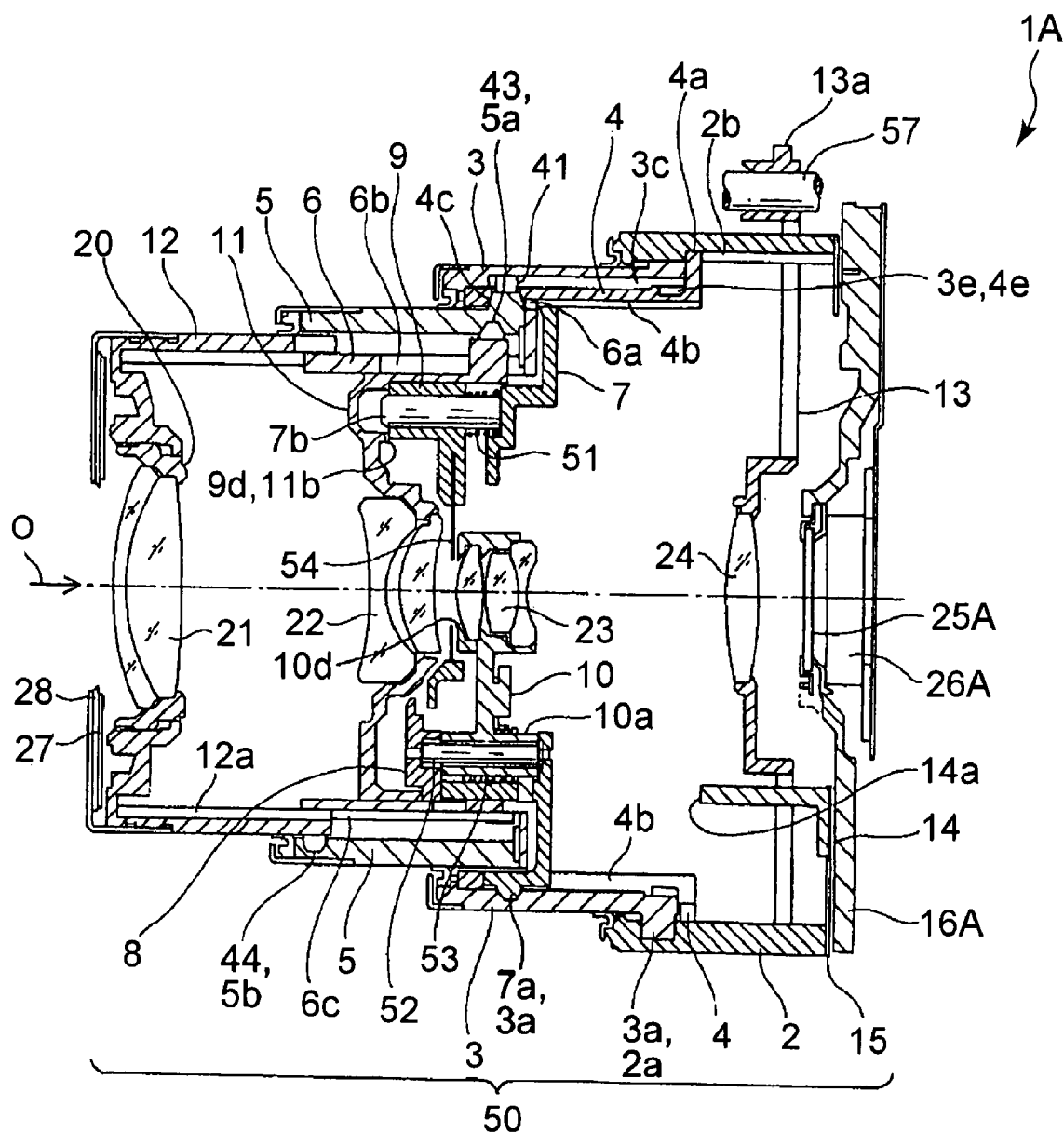
FIG. 6 is a sectional view of the lens barrel of FIG. 1 along an optical axis in a telephoto end.

The first unit frame 12 is driven by the cam frame 5 so as to move forwards and backwards in the regulated rotation state. The first unit frame 12 is a cylindrical member, and is fitted into and supported by the outer peripheral portion of the rectilinear guide frame 6 and the inner peripheral portion of the cam frame 5. Furthermore, a lens barrier 27 which openably closes a front surface of the first unit lens 21 is disposed on an inner side of a barrier press plate 28 (FIGS. 6, 9). An outer peripheral portion of this first unit frame 12 is provided with a projected cam follower 44. An inner peripheral portion of the first unit frame is provided with a guide protrusion 12a (FIG. 6) disposed along the optical axis O.

The cam follower 44 fits into the cam groove 5b of the cam frame 5. The guide protrusion 12a fits into the rectilinear groove 6c of the rectilinear guide frame 6. Therefore, the first unit frame 12 is driven so as to move forwards and backwards in a state in which the rotation is regulated by the rectilinear guide frame 6.

The lens barrier 27 is rotatably supported at a front end portion of the first unit frame 12, and is driven so as to open and close by a barrier driving lever (not shown) urged by a spring and rotatably supported. The barrier driving lever is rotated by a cutout-like cam portion 6e disposed at a front portion of the rectilinear guide frame 6, when a lens barrel 1 is driven so as to be retracted. In consequence, the lever drives the lens barrier 27 in a closing direction.

The shutter/third unit 32 is driven so as to move forwards and backwards by the rotary frame 3 in the regulated rotation state. As shown in FIG. 2, the shutter/third unit 32 includes a rectilinear frame 7 for the third unit as a support member, a press plate member 8, a shutter frame 9 which is a displacement frame, the third unit frame 10 which is a retreating frame to support the third unit lens 23, a shutter frame urging spring 51 which is urging means (a displacement frame driving mechanism) including a compression spring, a frame support shaft 52 and a third unit frame urging spring 53 which is a torsion spring.

The rectilinear frame 7 for the third unit is a frame member inserted into the movable frame 4 in a state in which the rotation is regulated by the movable frame 4. The rectilinear frame is driven so as to move forwards and backwards by the rotary frame 3. This rectilinear frame 7 for the third unit has an arm portion extended externally in three ways and provided with a guide protrusion 7a and a cam follower 42 projected from the protrusion. Furthermore, the rectilinear frame 7 is provided with a shaft support hole 7c and a shutter support shaft portion 7b projected forwards. It is to be noted that the rectilinear frame 7 for the third unit has a space where the third unit frame 10 can be retreated from a photographing optical path.

The shutter frame 9 has a central opening 9a, and a support shaft hole boss portion 9b provided with a support shaft hole 9c into which the shutter support shaft portion 7b slidably fits. In the shutter frame 9, a shutter blade 54 (FIG. 6) which opens and closes the opening 9a, and a shutter mechanism are incorporated. The mechanism includes a shutter actuator 55 which rotates the shutter blade 54.

The third unit frame 10 has a lens holding portion which holds the third unit lens 23, and a bearing boss portion 10a having a shaft hole 10b parallel to the optical axis. An outer peripheral portion of the boss portion 10a is provided with a follower pin 10c projected in a diametric direction. When the third unit frame 10 rotates centering on the shaft hole 10b, a position of the third unit lens 23 can be switched to a position (an advanced position) where the third unit lens 23 advances to enter the optical path and a position (a retreated position) where the third unit lens 23 is retreated from the optical path. Moreover, an aperture stop 10d is arranged at an end portion of the third unit frame 10 on a subject side. It is assumed that the lens retreated from the optical path in this manner is the third unit lens 23 disposed close to the aperture stop 10d of an optical system. In general, since diameters of all ray fluxes are minimized at an aperture stop position of the optical system, a diameter of a lens to be arranged in the vicinity of the aperture stop position or the like can be reduced. Therefore, assuming that the third unit lens 23 as an optical element disposed in the vicinity of the aperture stop position is a retreated optical element retreatable from the optical path, in a case where the third unit lens 23 is a retractable optical element that can be retreated from the photographing optical path, a rotation angle of the third unit frame 10 can be reduced. Moreover, the space for retreat is reduced. In consequence, an apparatus can be miniaturized.

When the lens barrel 1 is brought into a photographing state, the follower pin 10c is disposed away from a retreating cam 14. However, when the third unit frame 10 is retracted together with the rectilinear frame 7 for the third unit, the follower pin 10c abuts on (engages with) the retreating cam 14 on a fixed frame side, and is rotated in a retreating direction. Owing to the retreat driving, the third unit frame 10 rotates to retreat the third unit lens 23 from the photographing optical path via the central opening 9a of the shutter frame 9. It is to be noted that the retreating cam 14 is integrally fixed to and supported by the holding plate 15 attached to a rear end surface of the fixed frame 2 as described later, in a state in which the retreating cam 14 is protruded forwards along the optical axis O.

The press plate member 8 is a semi-annular member having a shaft support hole 8a. The member is attached to a front part of the rectilinear frame 7, and secured via a screw with a predetermined space from the rectilinear frame 7 in a state in which the third unit frame 10, the shutter frame 9 and the frame support shaft 52 are assembled between the press plate member 8 and the rectilinear frame 7 for the third unit. It is to be noted that opposite end portions of the frame support shaft 52 are fitted into the shaft support hole 7c of the rectilinear frame 7 for the third unit and the shaft support hole 8a of the press plate member 8, in a state in which the frame support shaft is rotatably inserted through the shaft hole 10b of the third unit frame 10. Moreover, the third unit frame urging spring 53 is inserted into the bearing boss portion 10a so as to urge the third unit frame 10 in a counterclockwise direction as viewed from the front side.

The third unit frame 10 assembled as described above is rotatably supported by the frame support shaft 52, and held so that the movement of the frame in the optical axis O with respect to the rectilinear frame 7 for the third unit is regulated. That is, the third unit frame 10 is nipped between the rectilinear frame 7 and the press plate member 8.

Moreover, when the support shaft hole 9c of the shutter frame 9 is slidably fitted into the shutter support shaft portion 7b of the rectilinear frame 7, the shutter frame is attached to a front part of the third unit frame 10. The shutter frame urging spring 51 is inserted into the shutter support shaft portion 7b so as to urge forwards the shutter frame 9.

Furthermore, the shutter frame 9 is brought into a free state, in a case where an abutment portion 11b disposed as displacement means (a displacement frame driving mechanism) at the second unit frame 11 does not abut on a front end surface 9d disposed as displacement means (a displacement frame driving mechanism) at the support shaft hole boss portion 9b of the shutter frame 9. In this free state, the shutter frame 9 moves forwards with respect to the rectilinear frame 7 for the third unit and the third unit frame 10, and is held in a state in which the shutter frame abuts on the press plate member 8. When the second unit frame 11 relatively moves in a retracting direction and the front end surface 9d is pressed by the abutment portion 11b, the shutter frame 9 moves integrally with the second unit frame 11 against the urging force of the shutter frame urging spring 51 in the retracting direction, that is, such a direction as to come close to the third unit frame 10. Moreover, when the third unit frame 10 is rotated to the retreated position where the third unit frame 10 retreats from the photographing optical path, the shutter frame 9 can be displaced and retracted by the second unit frame 11 until the shutter blade portion is stored in a space beside the third unit lens 23 (FIG. 9). That is, in the retracted state, at least a part of the shutter frame 9 enters a space where the third unit frame 10 has been disposed at the advanced position.

The rectilinear frame 7 for the third unit assembled with the press plate member 8, the shutter frame 9 and the third unit frame 10 is inserted into the inner peripheral portion of the second unit frame 11, the guide protrusion 7a is extended through the rectilinear groove 4b of the movable frame 4, and the cam follower 42 is further fitted into the cam groove 3d of the rotary frame 3 and incorporated. Therefore, the rectilinear frame 7 for the third unit is driven so as to move forwards and backwards by the rotary frame 3, in a state in which the rotation is regulated by the movable frame 4.

The fourth unit frame 13 is driven so as to move forwards and backwards during the focusing and at a time when the lens barrel is driven so as to be retracted. The fourth unit frame 13 holds the fourth unit lens 24, has a shaft hole 13a at one end portion thereof and a guide protruding portion 13b at the other end portion thereof, and is inserted into an inner rear part of the fixed frame 2. The guide shaft 57 disposed at the focusing unit 18 is slidably inserted into the shaft hole 13a. The guide protruding portion 13b is slidably fitted into a rectilinear groove (not shown) of the fixed frame 2.

This fourth unit frame 13 is driven so as to move forwards and backwards in the optical axis O direction to a focusing position where the photographing can be performed and a retracted position along the guide shaft 57 via the gear array and the feed screw by the focusing actuator of the focusing unit 18. Moreover, when the fourth unit frame 13 is retracted to the retracted position at the rear end portion of the fixed frame 2, the fourth unit frame 13 is stored in an empty space along the photographing optical path at a rear portion of the third unit lens 23 held by the third unit frame 10 at the retracted position (FIG. 9).

The holding plate 15 is a plate-like member formed of a metal plate, and is attached to a rear end surface of the fixed frame 2 in which lens frame members are incorporated as the lens barrel main body section 50. The plate is secured via a small screw and an engagement portion. As shown in FIG. 3, an opening 15a is disposed at the center of the holding plate 15, an outer peripheral portion of the plate is provided with small screw insertion holes 15b, 15e and cutout portions 15g, 15h and 15i. A front part of the plate is provided with a fixing engagement portion 15d formed by bending the plate forwards. In the holding plate 15, the retreating cam 14 as a third unit frame driving cam is integrally disposed at a peripheral portion of the opening 15a by insertion molding, in a state in which the cam is vertically directed forwards along the optical axis O. The cutout portions 15g, 15h and 15i are cutouts for relief via which bosses of small screw holes 2f, 2g and 2h of the fixed frame 2 are exposed so as to attach sensor bases 16A, 16B described later.

The retreating cam 14 has a cam surface 14a as a retreating cam surface having a tilted surface with respect to the optical axis O, and a retreated wall surface 14b as a retreated position holding wall surface formed of a surface extended along the optical axis O.

The holding plate 15 is attached to the fixed frame 2 at a rear end of the lens barrel main body section 50 in which the lens frame members are incorporated. As shown in FIG. 4, the holding plate 15 is secured to the rear end surface of the fixed frame 2 assembled with lens frame members such as the rotary frame 3. Specifically, in a state in which the fixing engagement portion 15d is engaged with an engaging protrusion (not shown) disposed at the fixed frame 2, a small screw 71 inserted through the small screw insertion hole 15b is screwed into the fixed frame 2. Furthermore, a small screw 72 inserted through a cover member 56 which supports the feed screw and the like of the focusing unit 18 is inserted through the small screw insertion hole 15b, and screwed into the fixed frame 2 so as to fasten the cover member 56 together. In consequence, the holding plate 15 is secured to the fixed frame 2.

The holding plate 15 is secured to the fixed frame 2 to complete the lens barrel main body section 50. In this state, the lens barrel main body section 50 can rotate and move forwards and backwards the lens frame members, and can further check an operation such as the retreating of the third unit frame 10 (assembly inspection).

As shown in FIG. 3, the one sensor unit 33A includes the sensor base 16A, an optical low pass filter 25A fixed to the sensor base 16A and a CCD 26A which is an image pickup device. Therefore, this sensor unit 33A is an image pickup unit which does not have any blur correcting function.

The sensor base 16A is fixed with small screws to secure the sensor unit 33A to the rear end surface of the fixed frame 2 of the lens barrel main body section 50 to which the holding plate 15 is attached as shown in FIG. 4. Specifically, the sensor base 16A is provided with three small screw insertion holes 16Aa, 16Ab and 16Ac, a rotation stop elongated hole 16Ad and a positioning pin 16Ae. The sensor base 16A is positioned via a positioning pin hole 2m and a rotation stop pin 2i at the rear end surface of the fixed frame 2 shown in FIG. 4, the positioning pin 16Ae and the positioning elongated hole 16Ad. In this state, small screws 74, 75 and 76 inserted through the small screw insertion hole 16Aa and the like are screwed into the small screw holes 2f, 2g and 2h which are sensor base attaching portions of the fixed frame 2, and fixed to the fixed frame 2. When the sensor unit 33A is fixed in this manner, the sensor unit is attached to the lens barrel main body section 50, thereby completing the assembling of the lens barrel 1A.

The other sensor unit 33B is an image pickup unit having a camera-shake correcting function. As shown in FIG. 3, the sensor unit 33B has the sensor base 16B, a Y-guide shaft 61 supported by the sensor base 16B, and a slider (a first movement member) 63 slidably supported in a Y-direction by the Y-guide shaft 61. The sensor unit 33B further has an X-guide shaft 62 supported by the slider 63, a sensor holding frame (a second movement member) 64 slidably supported in an X-direction by the X-guide shaft 62, an optical low pass filter 25B and a CCD 26B as an image pickup device attached to the sensor holding frame 64, and a Y-actuator 65 and an X-actuator 66 supported by the sensor base 16B.

It is to be noted that the X and Y-directions are directions crossing the optical axis O at right angles and crossing each other at right angles, and directions extending in a lateral direction and a vertical direction of the CCD 26B.

The sensor base 16B is provided with three small screw insertion holes 16Ba, 16Bb and 16Bc, a rotation stop elongated hole 16Bd and a positioning pin 16Be. Arrangements and shapes of these small screw insertion holes 16Ba, 16Bb and 16Bc, the rotation stop elongated hole 16Bd and the positioning pin 16Be are similar to those of the small screw insertion holes 16Aa, 16Ab and 16Ac, the elongated hole 16Ad and the positioning pin 16Ae disposed at the sensor base 16A.

The small screw holes 2f, 2g and 2h, the positioning pin hole 2m and the rotation stop pin 2i which are attaching portions arranged in this manner at the fixed frame 2 are constituted so that a plurality of sensor units having specifications are attached.

The Y-actuator 65 as a Y-direction driving mechanism drives the slider 63 in the Y-direction via a feed screw (not shown). On the other hand, the X-actuator 66 as an X-direction driving mechanism drives the sensor holding frame 64 in the X-direction via a feed screw (not shown). Therefore, the sensor holding frame 64 is driven along a plane parallel to a light receiving surface of the CCD 26B by the Y-actuator 65 and the X-actuator 66.

The sensor unit 33B constituted as described above is also attached by fixing the sensor base 16B, with screws, to the rear end surface of the fixed frame 2 of the lens barrel main body section 50 to which the holding plate 15 is attached by a method similar to that for the sensor unit 33A.

That is, in a state in which the sensor base 16B is positioned by the positioning pin hole 2m and the rotation stop pin 2i at the rear end surface of the fixed frame 2 shown in FIG. 4, the positioning pin 16Be and the rotation stop elongated hole 16Bd, the small screws 74, 75 and 76 inserted through the small screw insertion holes 16Ba, 16Bb and 16Bc are screwed into the small screw holes 2f, 2g and 2h which are sensor base attaching portions of the fixed frame 2 to directly fix the sensor base to the fixed frame 2. When the sensor base is fixed in this manner, the sensor unit 33B is attached to the lens barrel main body section 50, thereby completing the assembling of the lens barrel 1B.

In each of the lens barrels 1A and 1B, as described above, the sensor base 16A or 16B allowed to directly abut on a rear end surface 2j or 2k of the fixed frame 2 as shown in FIG. 5 is fixed with the small screws, but the base is held with a gap δ0 from the holding plate 15 separately secured to the rear end surface of the fixed frame 2. Therefore, a position of the CCD 26A or 26B to be attached in the optical axis O direction is not influenced by the holding plate 15, and the CCD 26A or 26B can precisely be positioned in the optical axis O direction with respect to the lens barrel main body section 50.

It is to be noted that, in a case where camera shake occurs during the photographing in a state in which the lens barrel 1B is incorporated in a digital camera, the sensor holding frame 64 which holds the CCD 26B in such a direction as to correct the camera shake is driven in such a direction as to cancel the camera shake by the Y-actuator 65 and the X-actuator 66 based on an output of a camera shake detection sensor arranged on a camera side. In consequence, data of a shot image which is not blurred is introduced by the CCD 26B.

In the present embodiment, a sensor unit having a different function can be attached to the same lens barrel main body section 50 as described above. That is, in a case where the sensor unit 33A which does not have any blur correcting function or the sensor unit 33B having the blur correcting function is selectively attached to the main body section, one of the lens barrels 1A, 1B having different specifications can be completed.

Next, an operation of moving the lens frame members of the lens barrel 1A constituted as described above forwards and backwards will be described with reference to FIGS. 6 to 12. It is to be noted that the lens barrel 1B is also similarly moved forwards and backwards.

Figure 7:
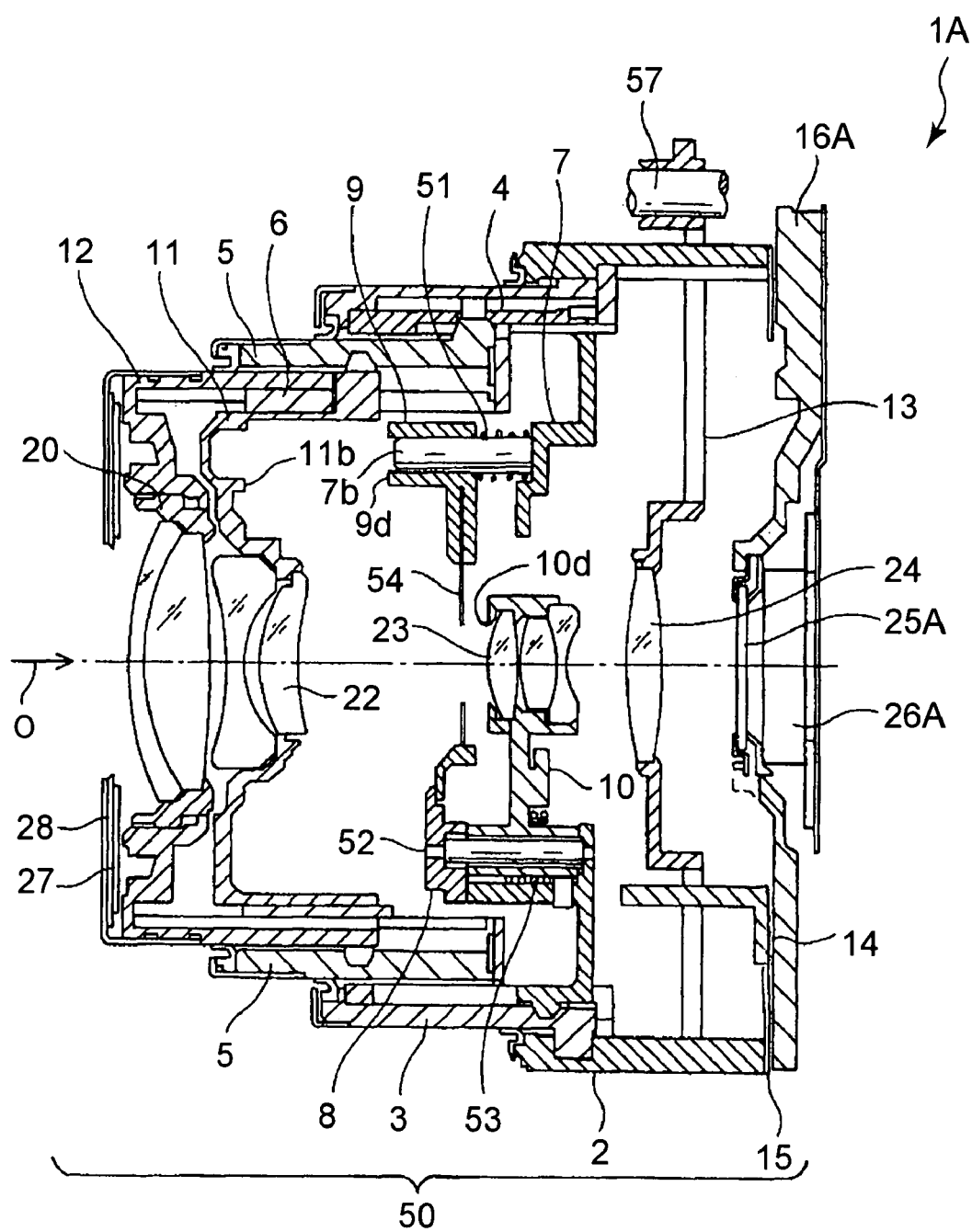
FIG. 7 is a sectional view of the lens barrel of FIG. 1 along the optical axis in a wide-angle end.
Figure 10:
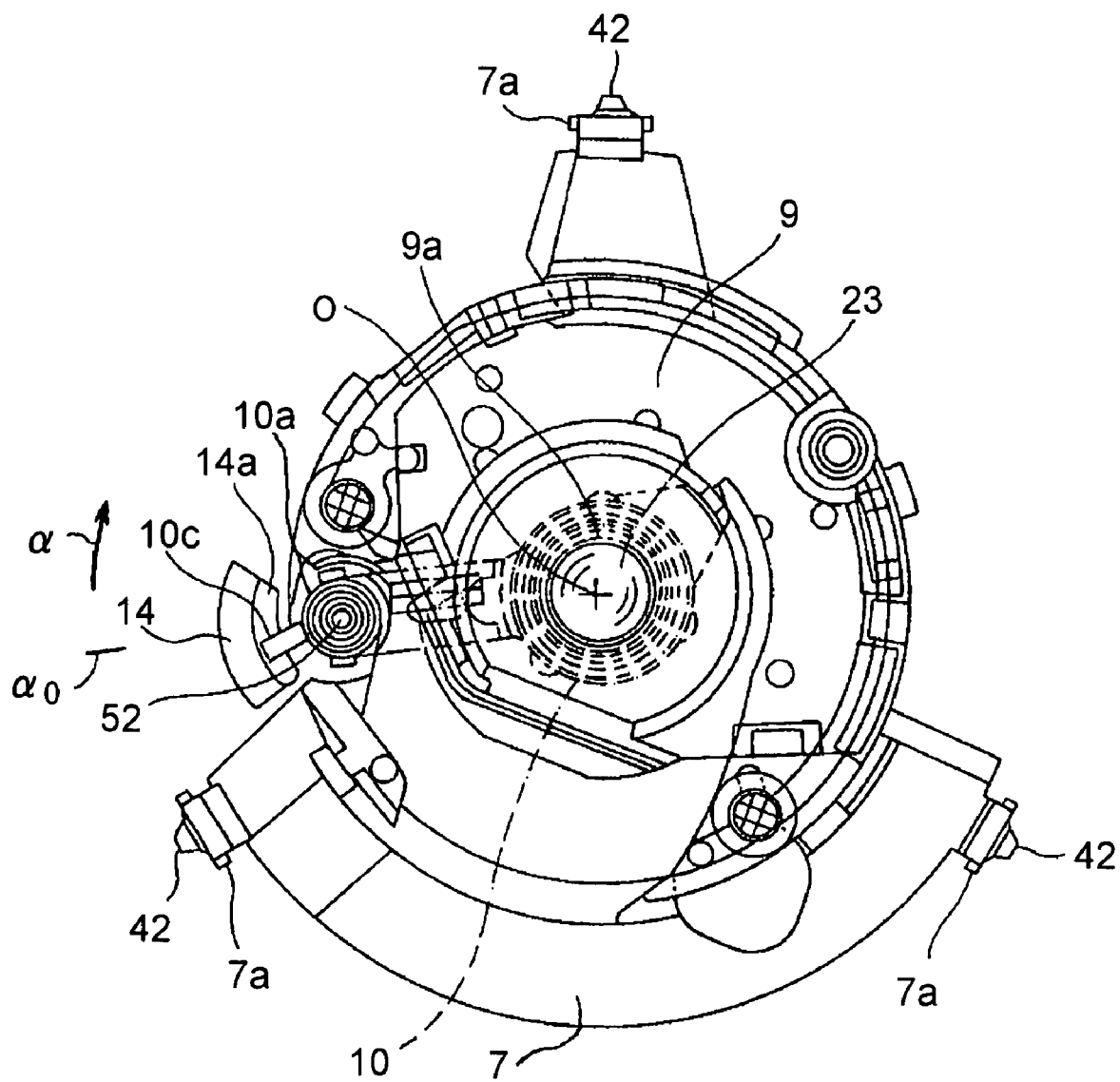
FIG. 10 is a sectional view cut along the arrows of FIG. 2, showing a state in which the third unit lens is disposed at an advanced position along a photographing optical path.
Figure 11:
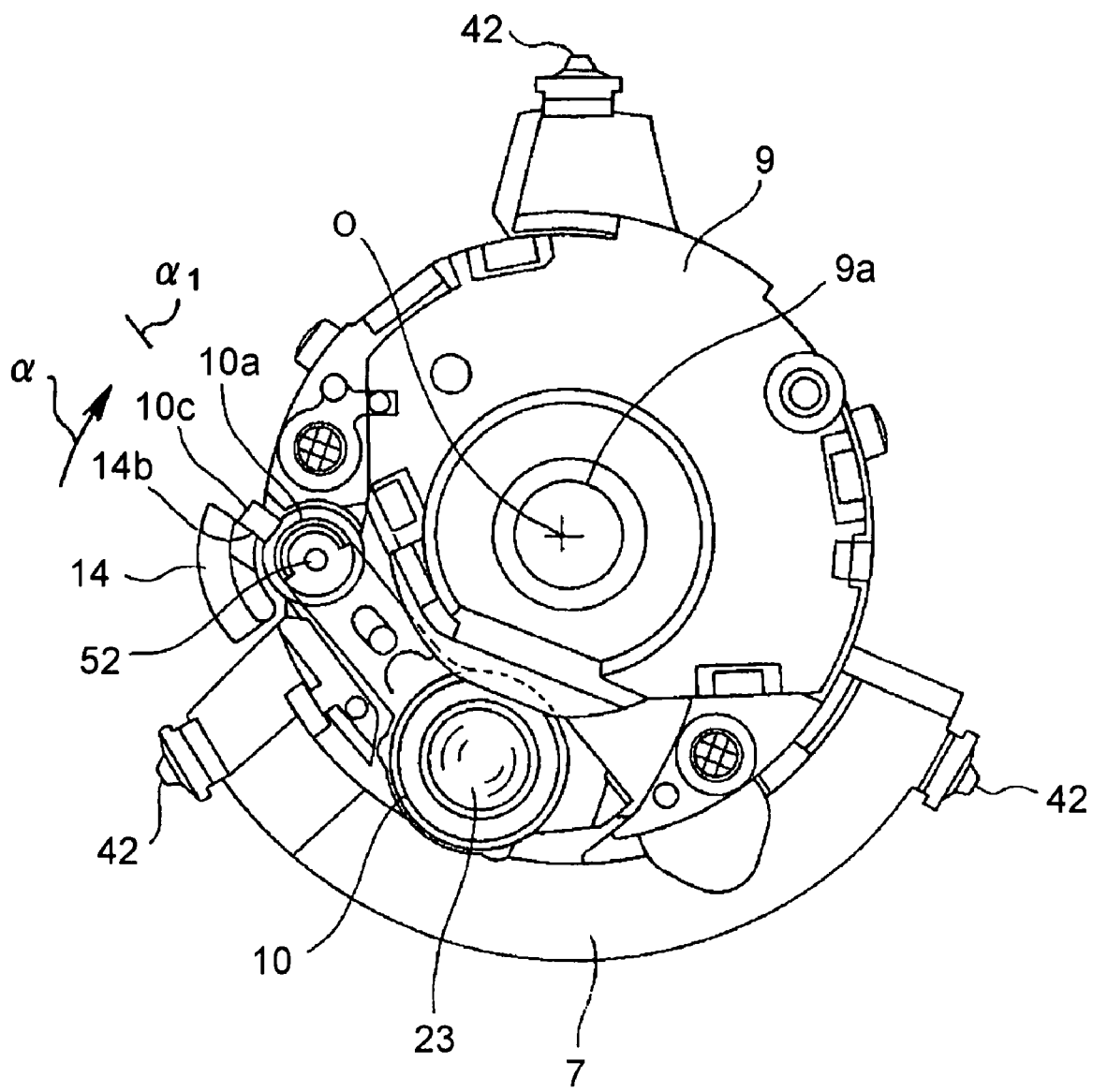
FIG. 11 is a sectional view cut along the arrows of FIG. 2, showing a state in which the third unit lens is retreated to a retreated position.
Figure 12:
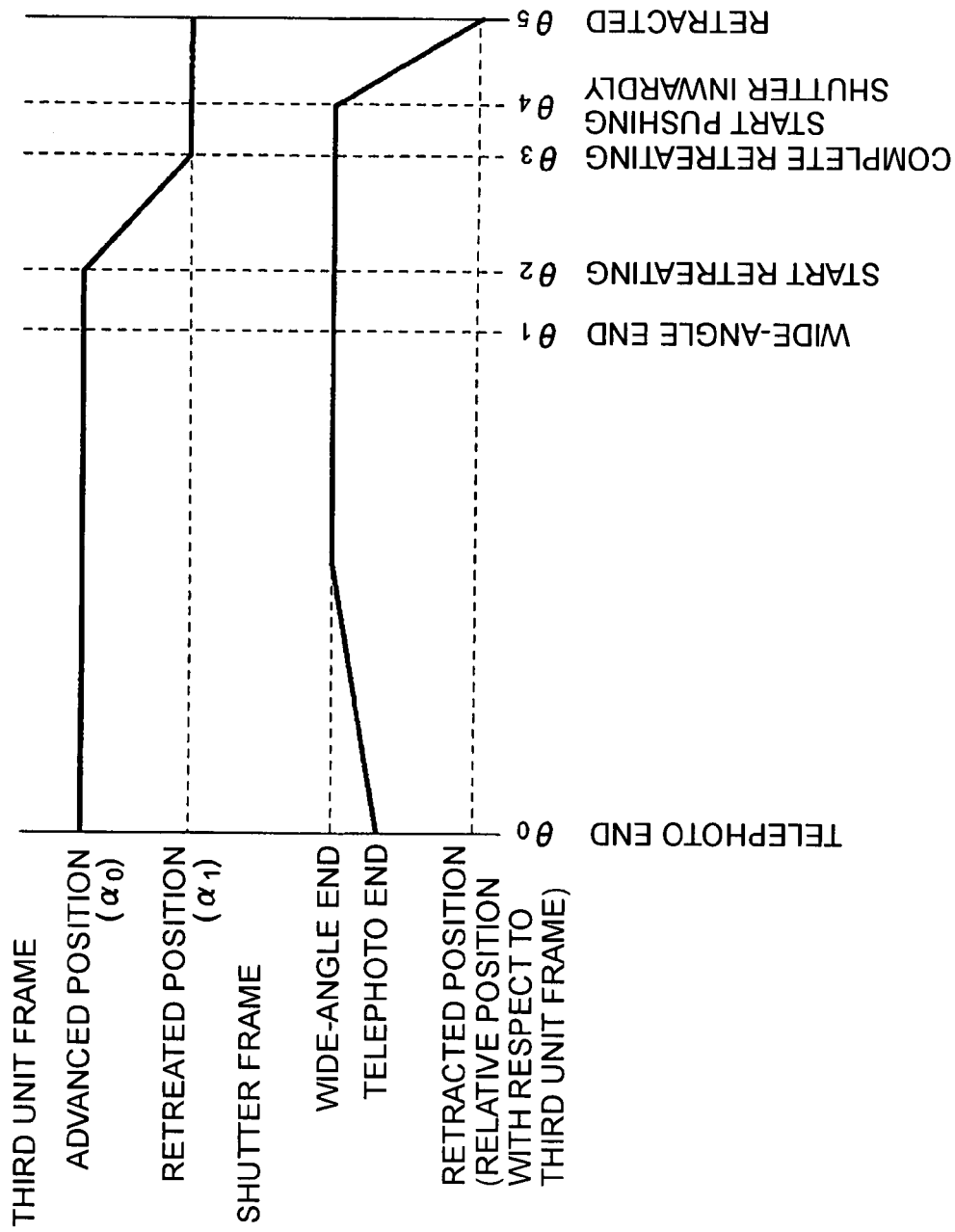
FIG. 12 is a diagram of the lens barrel of FIG. 1, showing a change of a position of a third unit frame with respect to a rotation angle of a rotary frame from a telephoto end to a retracted state and a change of a relative position of the shutter frame with respect to the third unit frame.

FIG. 6 is a sectional view of the lens barrel 1A along the optical axis in a telephoto end (a rotation angle θ0 of a rotary frame). FIG. 7 is a sectional view of the lens barrel along the optical axis in a wide-angle end (a rotation angle θ1 of the rotary frame). FIG. 8 is a sectional view of the lens barrel along the optical axis, showing a state in which the lens barrel is retracted from the wide-angle end and in which a shutter frame starts to be collapsed, after the third unit lens (the retreated lens) is retreated (a rotation angle θ4 of the rotary frame). FIG. 9 is a sectional view showing a retracted state of the lens barrel along the optical axis (a rotation angle θ5 of the rotary frame). FIGS. 10 and 11 are sectional views cut along the arrows of FIG. 2. FIG. 10 shows a state in which the third unit lens is disposed at an advanced position along a photographing optical path, and FIG. 11 shows a state in which the third unit lens is retreated to a retreated position, respectively. FIG. 12 is a diagram of the lens barrel showing a change of a position of the third unit frame with respect to the rotation angle of the rotary frame from a telephoto end to a retracted state and a change of a relative position of the shutter frame with respect to the third unit frame.

In the following description, it is assumed that the lens barrel 1A is first disposed in a photographable telephoto end (FIG. 6). Subsequently, an operation (a set-down operation) of retracting the lens barrel from a retracting state (FIG. 8) to a retracted state (FIG. 9) where the photographing is not performed through a photographable wide-angle end (FIG. 7) will be described. When the lens barrel is extended from the retracted state to the photographable state (during a setup operation), an operation is executed in reverse to the retracting operation.

As shown in FIG. 6, when the lens barrel 1A is disposed in the telephoto end and the rotary frame 3 is disposed at a rotary position at the rotation angle θ0, the cam follower 3a fits into the circumferential groove portion of the cam groove 2a of the fixed frame 2 and has an extended state, and the rotary frame 3 is extended to the photographable position together with the movable frame 4. The cam frame 5 is positioned by the cam groove 4c of the movable frame 4, and further extended forwards from the rotary frame 3. The first unit frame 12 and the second unit frame 11 are extended in the telephoto end by the cam grooves 5b and 5a of the cam frame 5, respectively.

Furthermore, in the telephoto end, the rectilinear frame 7 for the third unit is extended by the cam groove 3d of the rotary frame 3. In addition, the front end surface 9d of the support shaft hole boss portion 9b of the shutter frame 9 is pressed by the abutment portion 11b of the second unit frame 11 to position the shutter frame in the telephoto end (FIGS. 6, 12). The third unit frame 10 moves together with the rectilinear frame 7 for the third unit, and is disposed in the telephoto end along the optical axis O. In this state, the follower pin 10c of the third unit frame 10 is disposed away from the cam surface 14a of the retreating cam 14. Therefore, the third unit frame 10 is rotated counterclockwise by the urging force of the third unit frame urging spring 53, inserted into the photographing optical path and disposed at an advanced position (a rotation angle α0). The third unit lens 23 is disposed on an image pickup device side from the central opening 9a of the shutter frame 9, and disposed along the optical axis O of the photographing optical path at the advanced position (FIGS. 10, 12).

In the positioned state of the shutter frame 9, the shutter blade 54 supported by the shutter frame 9 in the optical axis O direction is interposed between the second unit lens 22 and the third unit lens 23, and positioned remarkably close to the third unit lens 23. When the third unit lens 23 is disposed close to the shutter blade 54 in this manner, the shutter blade 54 can be arranged close to the aperture stop 10d disposed before the third unit lens 23. In consequence, unevenness of quantities of an axial ray and an off-axial ray can be prevented from being generated at a time when the shutter blade 54 is opened or closed, and a characteristic of the shutter can be improved.

The fourth unit frame 13 is moved forwards or backwards to the focusing position by the focusing unit 18 in accordance with the telephoto end position.

Subsequently, in a case where the lens barrel 1A is brought into the wide-angle end, the rotary frame 3 is rotated at the rotation angle θ1 by the zooming unit 17 via the long gear 45. The cam frame 5 is retracted while rotating. When the cam frame 5 rotates, as shown in FIG. 7, the first unit frame 12 is retracted, the second unit frame 11 are extended, and the frames move to the wide-angle end, respectively. When the rotary frame 3 rotates, the rectilinear frame 7 for the third unit is retracted in the wide-angle end. However, since the front end surface 9d of the support shaft hole boss portion 9b of the shutter frame 9 is detached from the abutment portion 11b of the second unit frame 11, the shutter frame 9 moves to abut on the press plate member 8 in the wide-angle end (FIGS. 7, 12). When the shutter frame 9 abuts on the press plate member 8 in this manner, a periphery of the shutter blade 54 of the shutter frame 9 is slightly detached from the third unit lens 23 as compared with the status of telephoto end. In this state, the shutter frame 9 does not interfere with the rotating operation of the third unit frame 10 in a retreating direction.

As described above, according to the present embodiment, in the wide-angle end, the shutter blade 54 is detached from the aperture stop 10d as compared with the status of telephoto end. That is, in the wide-angle end, the shutter blade 54 is detached from the aperture stop 10d on a subject side. In consequence, a coma and the like due to the off-axial ray which are easily generated in the wide-angle end can effectively be reduced. It is to be noted that even in the wide-angle end, the shutter blade 54 can be disposed in the vicinity of the aperture stop 10d in the same manner as in the telephoto end.

Moreover, in the wide-angle end, the follower pin 10c of the third unit frame 10 is detached from the cam surface 14a of the retreating cam 14, and the third unit frame 10 is inserted into the photographing optical path, and kept at the advanced position as shown in FIG. 10.

The fourth unit frame 13 is moved forwards or backwards to the focusing position by the focusing unit 18 in the wide-angle end.

Subsequently, in a case where the lens barrel 1A is set down into the retracted state, the lens barrel is brought from the wide-angle end of FIG. 7 to the retracted state of FIG. 9 through the retracting state of FIG. 8. Specifically, in the wide-angle end of FIG. 7, the rotary frame 3 is further rotated counterclockwise by the zooming unit 17. When the rotary frame 3 is rotated in this manner, the rotating rotary frame 3 moves in the retracting direction.

When the rotary frame 3 moves in the retracting direction, the first unit frame 12 and the second unit frame 11 move in the retracting direction via the cam frame 5. Moreover, the rectilinear frame 7 for the third unit moves in the retracting direction together with the shutter frame 9 and the third unit frame 10.

While the rotary frame 3 moves as described above and rotates to the retreating start rotation angle θ2 (FIG. 12), the follower pin 10c of the third unit frame 10 abuts on (engages with) the cam surface 14a of the retreating cam 14, and starts rotating clockwise (in an α-direction of FIG. 10) so as to retreat from the photographing optical path of the third unit frame 10. It is to be noted that the lens barrier 27 starts rotating in a closing direction in a last half period of the rotating operation of the third unit frame 10 in the retreating direction.

Furthermore, when the rotary frame 3 rotates to the retreat completion rotation angle θ3 (FIG. 12), the follower pin 10c moves from the cam surface 14a to reach the retreated wall surface 14b, the third unit frame 10 rotates at the rotation angle α1 to the retreated position as shown in FIGS. 8, 11 and 12, and the retreating of the third unit lens 23 from the photographing optical path is completed.

It is to be noted that, for a retreating period from a time when the follower pin 10c engages with the cam surface 14a of the retreating cam 14 as described above until the follower pin reaches the retreated wall surface 14b (the state of FIG. 8), the shutter frame 9 is not pressed by the abutment portion 11b of the second unit frame 11. A state in which the shutter frame abuts on the press plate member 8 is retained. A state in which the third unit frame 10 is disposed away from the shutter frame 9 continues (the shutter frame in the wide-angle end shown in FIG. 12). Therefore, when the third unit frame 10 is rotated and retreated, the shutter frame 9 does not interfere, and the third unit frame can smoothly be retreated.

After the retreating rotation of the third unit frame 10 is completed, the third unit frame is further retracted in the retracting direction together with the rectilinear frame 7 for the third unit, and the first unit frame and the second unit frame 11 are also retracted. In a case where the rotary frame 3 rotates at the rotation angle θ4 (FIG. 12) to start pushing the shutter inwardly and the second unit frame 11 is retracted, the abutment portion 11*b* abuts on the front end surface 9*d* of the shutter frame 9, the shutter frame 9 is pressed and the shutter frame urging spring 51 is further compressed to start pushing the shutter frame 9 inwardly. When the pushing operation (the retracting operation) is performed, the shutter frame 9 comes close to the third unit frame 10, and the shutter blade portion of the shutter frame 9 enters a space of the retreated third unit frame 10 on an optical path side.

When a further retracting operation is continued to rotate the rotary frame 3 to the retracting rotation angle θ5, the rotary frame 3, the cam frame 5, the first unit frame 12, the second unit frame 11, the rectilinear frame 7 for the third unit and the like are completely retracted to retracted positions, respectively (FIG. 9). The shutter frame 9 is completely pressed by the second unit frame 11 to move to the retracted position (FIG. 12). In an empty space of the retreated third unit frame 10 on an optical axis O side, in addition to the shutter blade 54 held by the shutter frame 9, a part of the second unit lens 22 held by the second unit frame 11 and further the fourth unit lens 24 held by the fourth unit frame 13 are stored. The lens barrier 27 is also rotated to a closed position, and the retracting operation is completed.

As described above, in the lens barrel 1A or 1B of the present embodiment, in a case where the third unit frame 10 is brought into a photographable state in which lens frame members such as the first unit frame are projected, the third unit frame is disposed at the advanced position in the photographing optical path, but the third unit frame is rotated to the retreated position during the retracting operation of the lens frame members. When the third unit frame 10 is disposed at the advanced position, the third unit frame 10 can come close to the shutter frame 9. However, when the third unit frame 10 is moved from the advanced position to the retreated position, the third unit frame 10 comes away from the shutter frame 9, and can be moved to the retreated position. After the third unit frame reaches the retreated position, the shutter frame 9 comes close to the third unit frame 10, and is brought into the stored state (the retracted state). According to such a constitution, the lens barrel can smoothly be brought into the stored state (the retracted state).

Moreover, in the present embodiment, the retreating cam 14 which drives the third unit frame 10 to the retreated position is disposed integrally at the holding plate 15, and the holding plate 15 is directly secured to the fixed frame 2 to constitute the lens barrel main body section 50. All operations of the lens frames and that of this lens barrel main body can be confirmed only by checking the lens barrel main body section 50 (assembly inspection). After confirming these operations, the sensor units 33A and 33B having different functions are selectively attached to the lens barrel main body section 50 to complete one of the lens barrel 1A and 1B having different specifications. Since the operation of the lens barrel main body section 50 is confirmed in this manner before attaching the sensor, efficiency of an assembly inspection step improves. Different lens barrel main body sections do not have to be used for different specifications. When at least one type of lens barrel main body section is simply prepared, a plurality of lens barrels provided with image pickup units having a plurality of specifications can be provided, and productivity improves.

It is to be noted that, in the lens barrel of the above embodiment, a constitution is adopted in which, during the retracting (after retreating the third unit frame), the shutter frame 9 is pressed by the second unit frame 11 and retracted toward a third unit frame 10 side. However, the present invention is not limited to this embodiment, and a constitution can be adopted in which, during the retracting, the shutter frame 9 is moved forwards or backwards by, for example, the cam groove of the cam frame or the like to retreat the third unit frame, and the shutter frame is allowed to come close to the third unit frame 10. In this case, the shutter frame 9 can be allowed to come close to the third unit frame 10 in the wide-angle end.

Furthermore, in the above embodiment, as the sensor unit to be selectively attached to the lens barrel main body section 50, the sensor unit 33A which does not have the blur correcting function or the sensor unit 33B having the blur correcting function is applied. However, the present invention is not limited to this embodiment. For example, units having the different numbers of pixels of an image pickup device to be applied, units having different sizes of the image pickup device, or sensor units to which image pickup devices such as CCD and CMOS having different specifications are applied can selectively be attached.

In the present embodiment, the third unit frame 10 is disposed at the advanced position in the optical path, when the lens barrel is brought into a photographing state. The third unit frame is disposed at the retreated position from the optical path, when the lens barrel is brought into a reduced state. Therefore, the third unit frame may be referred to as a retreating frame. Since the rectilinear frame 7 for the third unit supports the retreating frame at the advanced position and the retreated position, the rectilinear frame may be referred to as a support frame. The shutter frame 9 is supported by the support frame, and can relatively be displaced in the optical axis direction. Therefore, the shutter frame may be referred to as a first translational frame. The shutter frame urging spring 51 biases the support frame to come away from the first translational frame in the optical axis direction. When the lens barrel is moved as described above, the second unit frame 11 moves. Therefore, the second unit frame may be referred to as a second translational frame. Since the retreating cam 14 engages with the retreating frame, and engages with the retreating frame during the switching of the lens barrel from the projected state to the stored state to position the retreating frame at the retreated position, the retreating cam may be referred to as a retreating frame driving cam. The zooming unit 17 may be referred to as a frame driving mechanism.

According to the present embodiment, the lens barrel can be provided which has a short dimension in the optical axis direction in the stored state and which can smoothly be stored.

What is claimed is:

1. A lens barrel to be switched between a photographing state and a stored state in which the lens barrel is reduced in an optical axis direction as compared with the photographing state, comprising:

a retreating frame which is disposed at an advanced position where the retreating frame advances into an optical path at a time when the lens barrel is in the photographing state and which is disposed at a retreated position where the retreating frame retreats from the optical path at a time when the lens barrel is in the reduced state;

a support frame which supports the retreating frame at the advanced position and the retreated position;

a first translational frame which is supported by the support frame and which is relatively displaced in the optical axis direction;

an urging spring which biases the support frame to come away from the first translational frame in the optical axis direction;

a second translational frame which moves during the switching of the lens barrel;

a retreating frame driving cam which engages with the retreating frame while the lens barrel is switched from a projected state to the stored state so as to position the retreating frame at the retreated position; and a frame driving mechanism which drives at least the support frame and the second translational frame in the optical axis direction and which displaces the first translational frame in the optical axis direction toward the support frame against an urging force of the urging spring, after the retreating frame is displaced from the advanced position to the retreated position, in a case where the lens barrel is switched from the projected state to the stored state.

2. The lens barrel according to claim 1, wherein the first translational frame is provided with a shutter mechanism which opens or closes the optical path.

3. The lens barrel according to claim 1, further comprising:
a fixed frame in which at least a part of each of the retreating frame, the support frame, the first translational frame, the second translational frame and the retreating frame driving cam is stored, in a case where the lens barrel is brought into the stored state,
to which the frame driving mechanism is attached and
which is fixed at a predetermined position with respect to the lens barrel.

4. The lens barrel according to claim 1, wherein the retreating frame is rotatably supported by the support frame.

5. The lens barrel according to claim 1, wherein a lens is supported by the retreating frame.

6. The lens barrel according to claim 1, wherein the frame driving mechanism includes a cam member, and the cam member is rotated to drive the support frame and the second translational frame in the optical axis direction.

7. The lens barrel according to claim 1, further comprising:
an image pickup device disposed at a rear end surface of the lens barrel.

8. The lens barrel according to claim 7, wherein the image pickup device has a sensor unit having a blur preventing function.

9. A lens barrel to be switched between a projected state in which the lens barrel is projected in an optical axis direction and a stored state in which the lens barrel is stored, comprising:
a retreating member which is disposed at an advanced position where the retreating member advances into an optical path at a time when the lens barrel is in the projected state and which is disposed at a retreated position where the retreating member retreats from the optical path at a time when the lens barrel is in the stored state;
a support member which supports the retreating member;
a first translational member which is supported by the support frame and which is relatively displaced in the optical axis direction with respect to the retreating member;

urging means for biasing the retreating member to come away from the first translational member in the optical axis direction;

retreating member driving means for positioning the retreating member at the retreated position in conjunction with the switching of the lens barrel from the projected state to the stored state; and displacement means for displacing the first translational member in the optical axis direction toward the retreating member against an urging force of the urging means after the retreating member is displaced from the advanced position to the retreated position, in a case where the lens barrel is switched from the projected state to the stored state.

10. The lens barrel according to claim 9, wherein the first translational member is provided with a shutter mechanism which opens or closes the optical path.

11. The lens barrel according to claim 9, further comprising:
a second translational member which is disposed before the first translational member and which moves in the optical axis direction in conjunction with a switched state of the lens barrel between the projected state and the stored state and which presses the first translational member to displace the first translational member in the optical axis direction at a time when the lens barrel is switched from the projected state to the stored state.

12. The lens barrel according to claim 9, wherein the retreating member is rotatably supported by the support member.

13. The lens barrel according to claim 12, wherein the retreating member driving means includes a cam portion which is arranged in the vicinity of a rear end portion of a lens and which engages with the retreating member to retreat the retreating member to the retreated position at a time when the lens barrel is switched from the projected state to the stored state.

14. The lens barrel according to claim 9, wherein a lens is supported by the retreating member.

15. The lens barrel according to claim 9, further comprising:
an image pickup device disposed at a rear end surface of the lens barrel.

16. The lens barrel according to claim 15, wherein the image pickup device has a sensor unit having a blur preventing function.

17. A method of switching a lens barrel from a photographing state in a telephoto end to a stored state through a photographing state in a wide-angle end, comprising:
enlarging a distance between a lens frame to which a lens is fixed and a shutter frame to which a shutter is fixed in an optical axis direction of the lens barrel, during the switching from the photographing state in the telephoto end to the photographing state in the wide-angle end;
moving the lens frame centering on a rotary shaft disposed away from an optical axis of the lens barrel to retreat the lens held by the lens frame from the optical axis of the lens barrel during the switching from the photographing state in the wide-angle end to the stored state; and
moving the shutter frame in the optical axis direction of the lens barrel to store at least a part of the shutter frame in a space which has been occupied by the lens frame, after the retreating is completed.

* * * * *